United States Patent
Agarwala et al.

(10) Patent No.: US 9,300,536 B2
(45) Date of Patent: Mar. 29, 2016

(54) CLUSTER-AWARE RESOURCE PROVISIONING IN A NETWORKED COMPUTING ENVIRONMENT

(71) Applicant: International Business Machines Corporation, Armonk, NY (US)

(72) Inventors: Sandip Agarwala, Sunnyvale, CA (US); Kavita Chavda, Roswell, GA (US); Michael L. Lamb, San Jose, CA (US); Stephen J. Luko, Jr., Tucson, AZ (US); Ramani R. Routray, San Jose, CA (US)

(73) Assignee: International Busines Machines Corporation, Armonk, NY (US)

( * ) Notice: Subject to any disclaimer, the term of this patent is extended or adjusted under 35 U.S.C. 154(b) by 352 days.

(21) Appl. No.: 13/759,255

(22) Filed: Feb. 5, 2013

(65) Prior Publication Data

US 2014/0223012 A1    Aug. 7, 2014

(51) Int. Cl.
*G06F 15/173* (2006.01)
*H04L 12/24* (2006.01)

(52) U.S. Cl.
CPC .......... *H04L 41/0836* (2013.01); *H04L 41/145* (2013.01); *H04L 41/0806* (2013.01); *H04L 41/0893* (2013.01); *H04L 41/14* (2013.01)

(58) Field of Classification Search
None
See application file for complete search history.

(56) References Cited

U.S. PATENT DOCUMENTS

| | | | |
|---|---|---|---|
| 6,931,567 B2 * | 8/2005 | Tanaka et al. | 714/6.3 |
| 7,774,444 B1 | 8/2010 | George et al. | |
| 7,870,360 B2 | 1/2011 | Johnson et al. | |
| 7,886,031 B1 | 2/2011 | Taylor et al. | |
| 8,024,440 B2 | 9/2011 | Jibbe | |
| 8,095,764 B1 * | 1/2012 | Bauer et al. | 711/170 |
| 8,166,128 B1 * | 4/2012 | Faulkner et al. | 709/214 |
| 2002/0065962 A1 * | 5/2002 | Bakke | G06F 13/385 710/38 |
| 2004/0215749 A1 | 10/2004 | Tsao | |
| 2006/0004918 A1 * | 1/2006 | Lubeck et al. | 709/223 |
| 2007/0064612 A1 * | 3/2007 | Armanino | H04L 45/123 370/238 |
| 2008/0147754 A1 * | 6/2008 | Littlefield | G06F 17/302 |
| 2011/0047345 A1 | 2/2011 | Johnson et al. | |
| 2011/0061057 A1 * | 3/2011 | Harris et al. | 718/104 |

(Continued)

OTHER PUBLICATIONS

Maitland, J., "Keeping Control Isn't Easy", Chapter 4: Cloud-Based Infrastructure, SearchCloudComputing.com, Publication Date: Oct. 2009, 17 pages.

(Continued)

*Primary Examiner* — Joshua Joo
(74) *Attorney, Agent, or Firm* — Noah A. Sharkan; Hunter E. Webb; Keohane & D'Alessandro PLLC

(57) ABSTRACT

Embodiments of the present invention provide an approach for providing cluster-aware (storage) resource provisioning in a networked computing environment (e.g., a cloud computing environment) based upon policies, best practices, and/or storage cluster/environment configurations. In a typical embodiment, a set of characteristics (e.g., computing resources/components, etc.) of a storage environment will be determined. A set of requirements for a set of workloads to be processed by the components of the storage environment will then be identified. A set of policies and a set of best practices will then be determined to identify a configuration of the storage environment to optimize the processing of the set of workloads according to the set of requirements. Based on the configuration, a plan will be generated that indicates a data path through the set of computing resources that minimizes a potential for error in processing the set of workloads.

25 Claims, 11 Drawing Sheets

(56) References Cited

U.S. PATENT DOCUMENTS

| | | | | |
|---|---|---|---|---|
| 2012/0042055 A1* | 2/2012 | Agarwala | ............ | G06F 9/5061 |
| | | | | 709/220 |
| 2012/0102291 A1* | 4/2012 | Cherian et al. | ................ | 711/170 |
| 2012/0124414 A1* | 5/2012 | Dallas et al. | ................... | 714/6.2 |
| 2013/0219407 A1* | 8/2013 | Weinman, Jr. | ................ | 718/105 |
| 2013/0262556 A1* | 10/2013 | Xu et al. | ....................... | 709/202 |
| 2013/0346994 A1* | 12/2013 | Chen et al. | .................... | 718/104 |
| 2014/0032595 A1* | 1/2014 | Makkar et al. | ................ | 707/770 |
| 2014/0330979 A1* | 11/2014 | Jackson | ........................ | 709/226 |

OTHER PUBLICATIONS

Microsoft Technet, "How Microsoft Designs the Virtualization Host and Network Infrastructure", Author Unknown, Published Jan. 2009, 11 pages.

Microsoft Technet, "Hyoer-V Planning and Deployment Guide", Microsoft Corporation, Author Unknown, Published Mar. 2009, 59 pages.

Mell, et al., "The NIST Definition of Cloud Computing", National Institute of Standards and Technology, Information Technology Laboratory, Version 15, Oct. 7, 2009, 2 pages.

\* cited by examiner

CLUSTER-AWARE RESOURCE PROVISIONING IN A NETWORKED COMPUTING ENVIRONMENT

TECHNICAL FIELD

Embodiments of the present invention relate to resource (e.g., storage resources/components) provisioning. Specifically, embodiments of the present invention relate to cluster-aware, resource provisioning in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Clustering solutions are often utilized in large enterprise and "mission critical" applications that may have high performance and availability requirements. This may be achieved by having multiple servers for the purpose of load balancing, or by having redundant servers for the purpose of high availability. Currently available cluster management tools focus mainly on servers and Internet Protocol (IP) connectivity, and rely on shared network storage like Network Attached Storage (NAS), Storage Area Network (SAN), etc., for storage resiliency. Modern enterprise storage systems are typically complex and have many possible configurations. For end-to-end performance optimization and availability, the configuration of storage resources and interconnection fabric should be carefully planned. Impromptu configuration may lead to poor availability, deteriorated performance or higher cost. Challenges may exist, however, in that current approaches generally involve manual configuration by "experts" in the field. Such approaches may unintentionally introduce data path faults, but may also be time consuming and inefficient.

SUMMARY

In general, embodiments of the present invention provide an approach for providing cluster-aware (storage) resource provisioning in a networked computing environment (e.g., a cloud computing environment) based upon policies, best practices, and/or storage cluster/environment configurations. In a typical embodiment, a set of characteristics (e.g., computing resources/components, etc.) of a storage environment will be determined. A set of requirements for a set of workloads to be processed by the components of the storage environment will then be identified. A set of policies and a set of best practices will then be determined to identify a configuration of the storage environment to optimize the processing of the set of workloads according to the set of requirements. Based on the configuration, a plan will be generated that indicates a data path through the set of computing resources that minimizes a potential for error in processing the set of workloads.

A first aspect of the present invention provides a computer-implemented method for providing cluster-aware resource provisioning in a networked computing environment, comprising: determining a set of characteristics of a storage environment, the storage environment comprising a set of computing resources; identifying a set of requirements for a set of workloads to be processed by the set of computing resources; analyzing a set of policies and a set of best practices to identify a configuration of the storage environment to optimize the processing of the set of workloads according to the set of requirements; and generating a plan based on the configuration, the plan indicating a data path through the set of computing resources that minimizes a potential for error in processing the set of workloads.

A second aspect of the present invention provides a system for providing cluster-aware resource provisioning in a networked computing environment, comprising: a bus; a processor coupled to the bus; and a memory medium coupled to the bus, the memory medium comprising instructions to: determine a set of characteristics of a storage environment, the storage environment comprising a set of computing resources; identify a set of requirements for a set of workloads to be processed by the set of computing resources; analyze a set of policies and a set of best practices to identify a configuration of the storage environment to optimize the processing of the set of workloads according to the set of requirements; and generate a plan based on the configuration, the plan indicating a data path through the set of computing resources that minimizes a potential for error in processing the set of workloads.

A third aspect of the present invention provides a computer program product for providing cluster-aware resource provisioning in a networked computing environment, the computer program product comprising a computer readable storage media, and program instructions stored on the computer readable storage media, to: determine a set of characteristics of a storage environment, the storage environment comprising a set of computing resources; identify a set of requirements for a set of workloads to be processed by the set of computing resources; analyze a set of policies and a set of best practices to identify a configuration of the storage environment to optimize the processing of the set of workloads according to the set of requirements; and generate a plan based on the configuration, the plan indicating a data path through the set of computing resources that minimizes a potential for error in processing the set of workloads.

A fourth aspect of the present invention provides a method for deploying a system for providing cluster-aware resource provisioning in a networked computing environment, comprising: providing a computer infrastructure being operable to: determine a set of characteristics of a storage environment, the storage environment comprising a set of computing resources; identify a set of requirements for a set of workloads to be processed by the set of computing resources; analyze a set of policies and a set of best practices to identify a configuration of the storage environment to optimize the processing of the set of workloads according to the set of requirements; and generate a plan based on the configuration, the plan indicating a data path through the set of computing resources that minimizes a potential for error in processing the set of workloads.

BRIEF DESCRIPTION OF THE DRAWINGS

These and other features of this invention will be more readily understood from the following detailed description of the various aspects of the invention taken in conjunction with the accompanying drawings in which.

Figure 1:
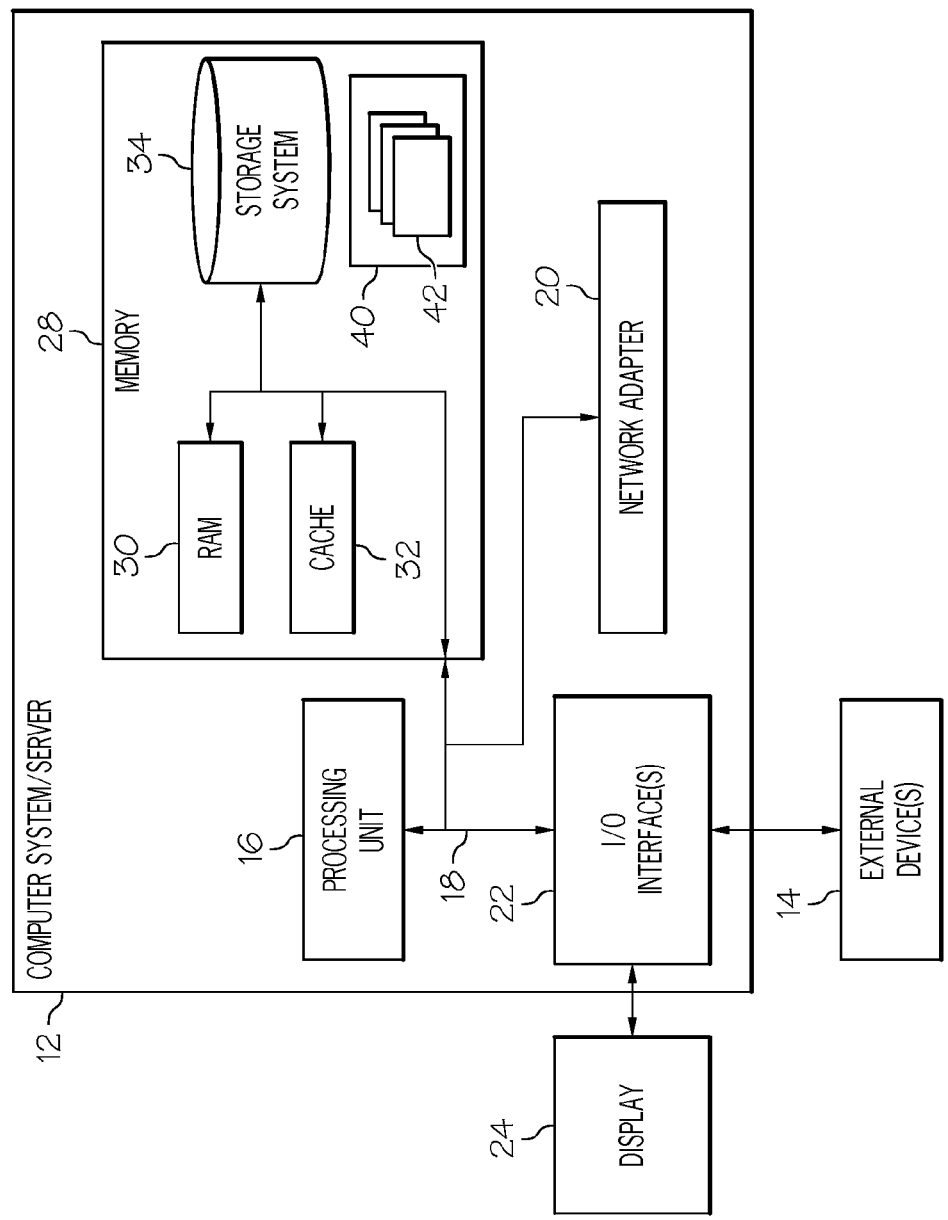
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In general, embodiments of the present invention provide an approach for providing cluster-aware (storage) resource provisioning in a networked computing environment (e.g., a cloud computing environment) based upon policies, best practices, and/or storage cluster/environment configurations. In a typical embodiment, a set of characteristics (e.g., computing resources/components, etc.) of a storage environment will be determined. A set of requirements for a set of workloads to be processed by the components of the storage environment will then be identified. A set of policies and a set of best practices will then be determined to identify a configuration of the storage environment to optimize the processing of the set of workloads according to the set of requirements. Based on the configuration, a plan will be generated that indicates a data path through the set of computing resources that minimizes a potential for error in processing the set of workloads.

The approach described herein automates the planning, optimization, and deployment of shared network storage for clusters. Along these lines, an intelligent analytic component/engine is provided that helps an administrator plan and provision storage resources for a cluster. This approach may suggest the creation of LUNs in a specific storage pool of a subsystem based on capacity and workload characteristics. Moreover, the approach described herein may also recommend fiber channel (FC) fabric zoning and multipath configurations.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
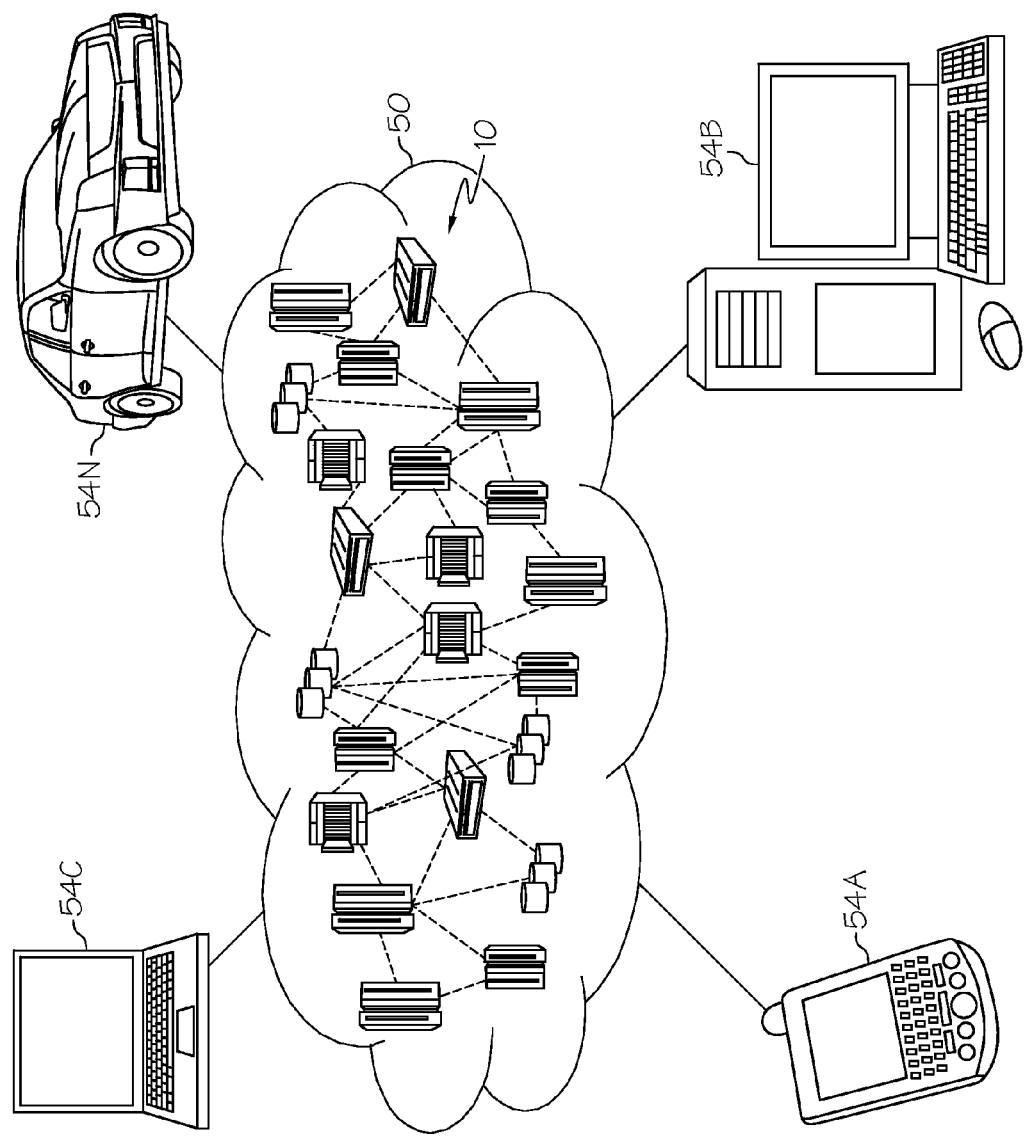
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
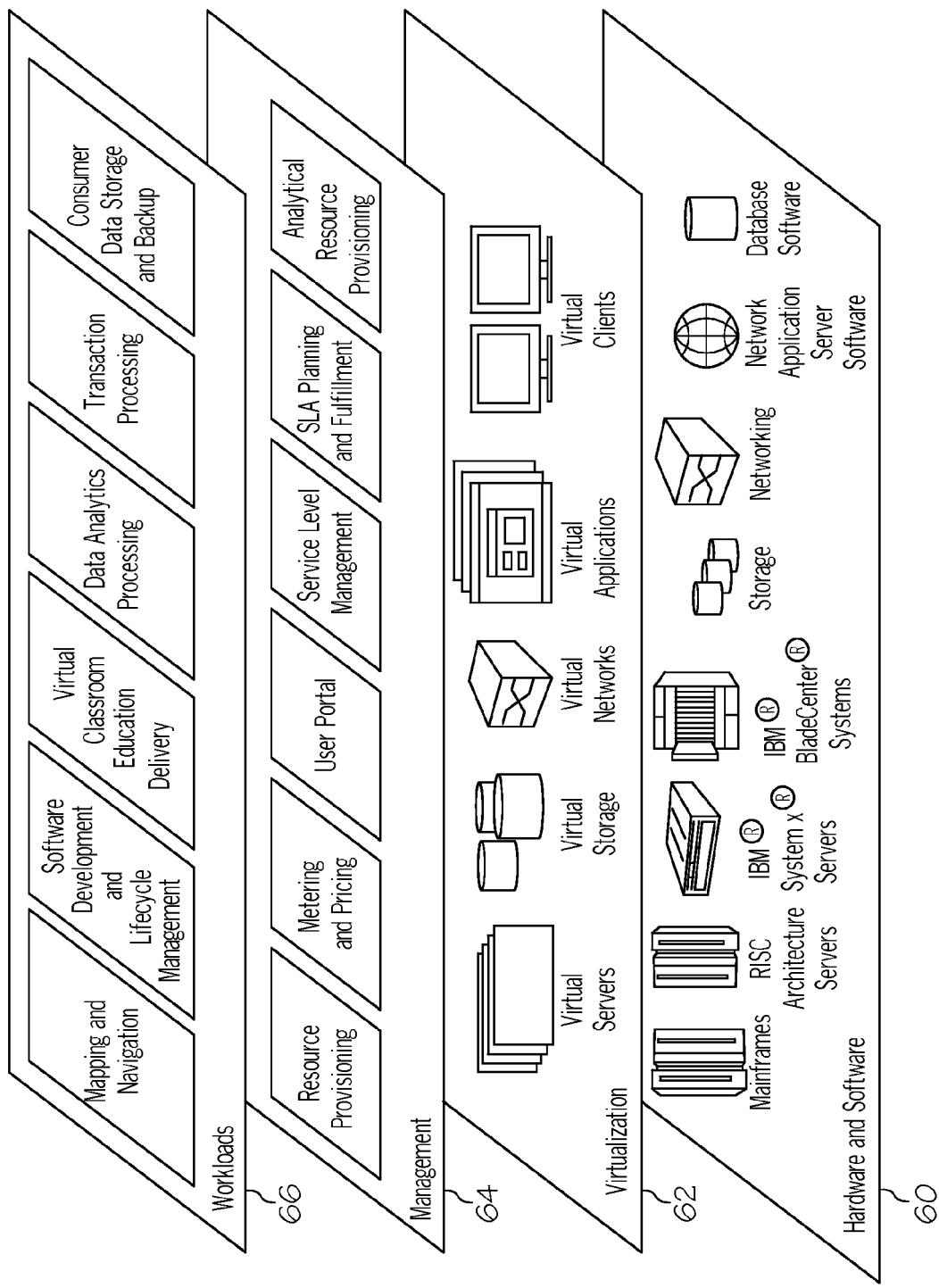
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is analytical resource provisioning, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the analytical resource provisioning functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
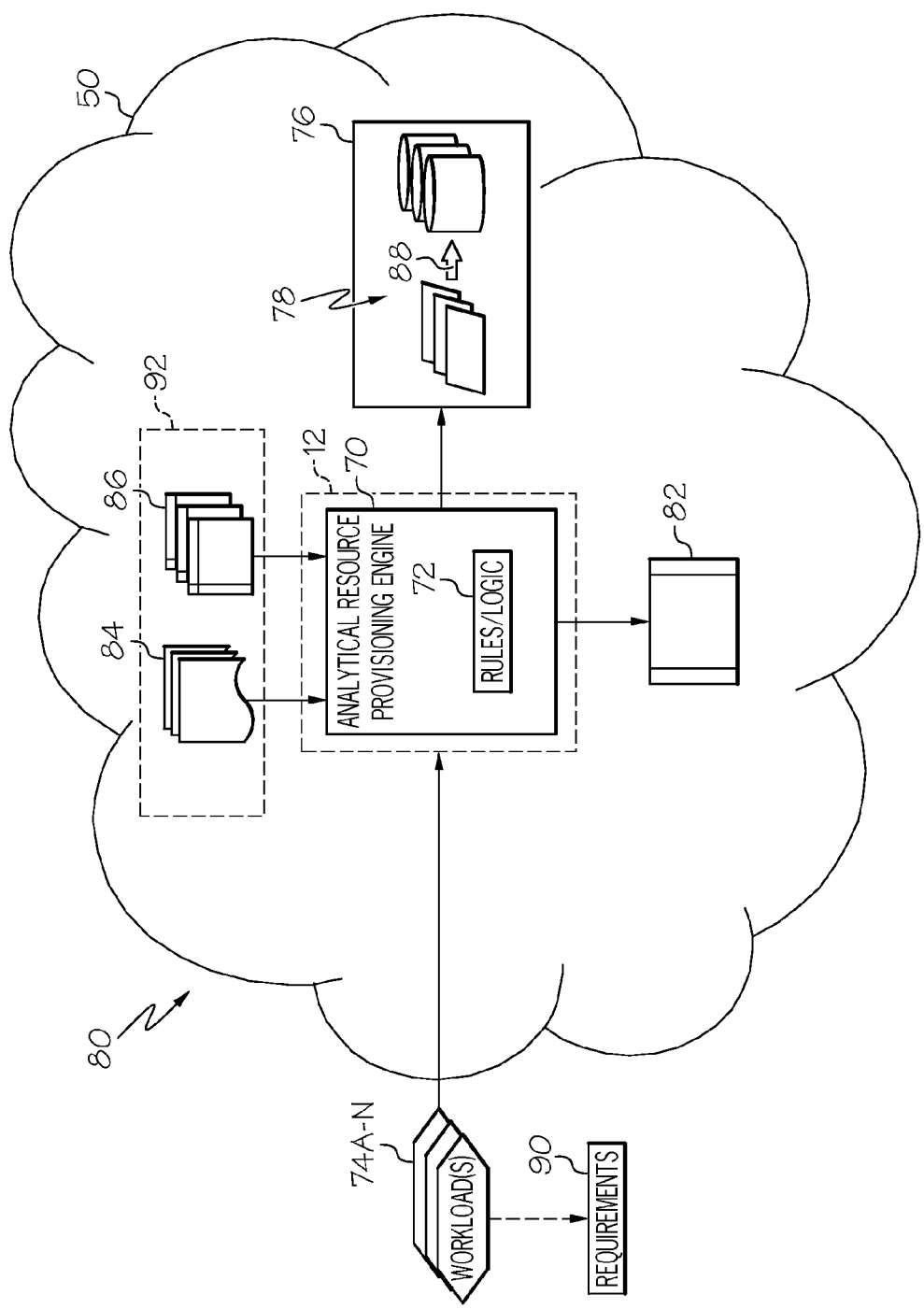
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 80 (e.g., a cloud computing environment 50). A computer system/server 12, which can be implemented as either a stand-alone computer system or as a networked computer system is shown in FIG. 4. In the event the teachings recited herein are practiced in a networked computing environment 80, each client need not have a analytical resource provisioning engine (engine 70). Rather, engine 70 could be loaded on a server or server-capable device that communicates (e.g., wirelessly) with the clients to provide analytical resource provisioning functionality. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules/logic 72 and/or provides analytical resource provisioning hereunder.

Along these lines, engine 70 may perform multiple functions similar to a general-purpose computer. Specifically, among other functions, engine 70 may (among other things): determine a set of characteristics of a storage environment 76, the storage environment comprising a set of computing resources 78 (e.g., at least one of the following computing resources/components: a set of cluster nodes, a set of host bus adapters (HBAs), a set of fiber channel (FC) fabrics, a set of storage controllers, a set of ports, or a set of storage volumes); identify a set of requirements for a set of workloads (e.g., active workloads and standby workloads) to be processed by the set of computing resources 78; analyze a set of policies 84 and a set of best practices 86 (e.g., as stored in one or more computer storage devices such as storage system 34 of FIG. 1, and shown collectively as processing guidelines 92 in FIG. 4) to identify a configuration of the storage environment 76 to optimize the processing of the set of workloads 74A-N according to the set of requirements 90; and/or generate a plan 82 based on the configuration, the plan 82 indicating a data path 88 through the set of computing 78 resources that minimizes a potential for error in processing the set of workloads 74A-N.

Figure 5:
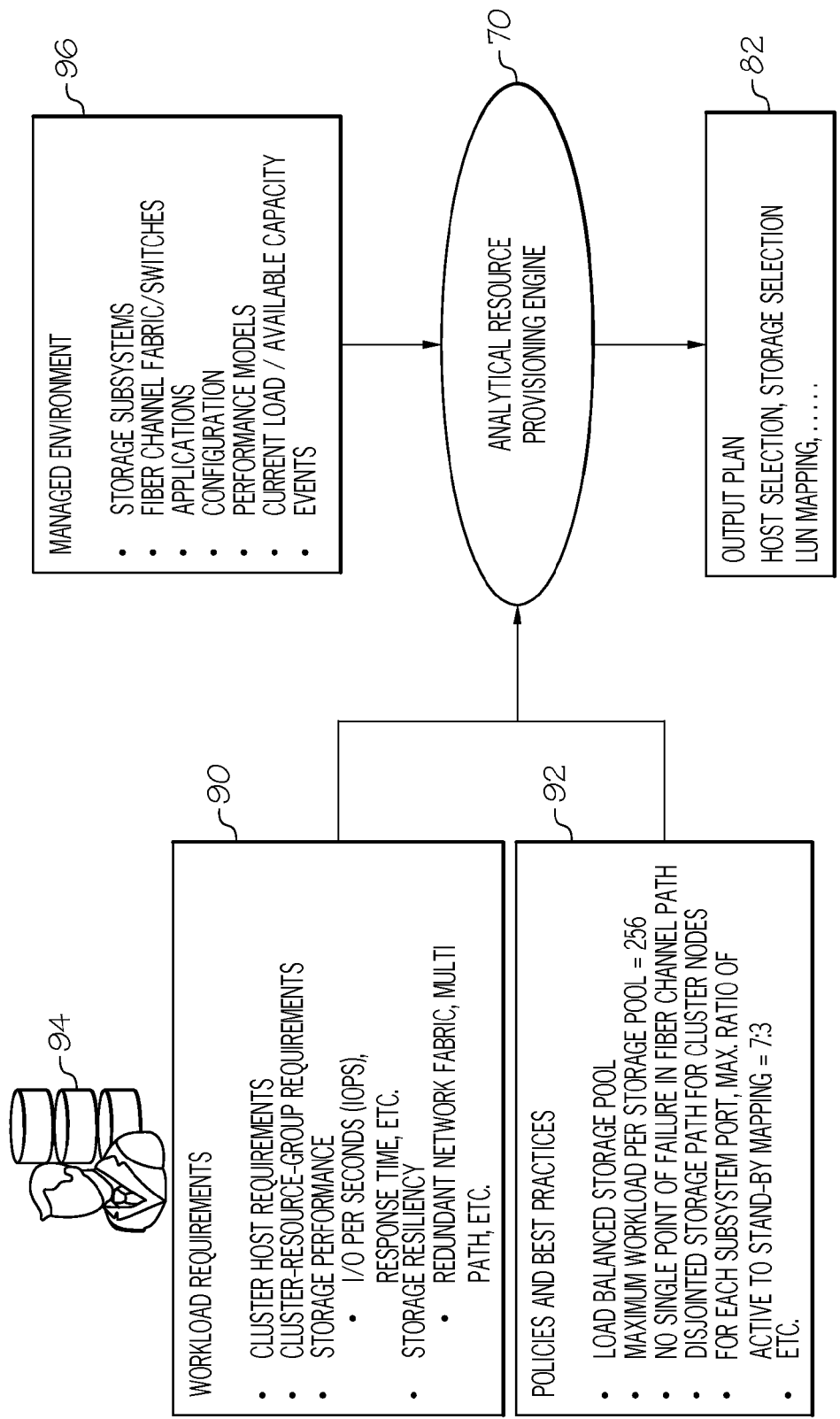
FIG. 5 depicts a process flow diagram according to an embodiment of the present invention.

Referring to FIG. 5, a framework further describing these concepts is shown. As depicted, engine 70 receives various types of input such as the following:

Workload requirements 90 (e.g., from an administrator 94, a database, or the like) for processing the set of workloads 74A-N. Such requirements 90 may include, for example, cluster-host requirements, cluster-resource-group requirements, storage performance (e.g., input/output per seconds (IOPS), response time, etc.), storage resiliency (e.g., redundant network fabric, multi-path, etc.), etc.

Sets of policies and/or sets of best practices (processing guidelines 92). Such processing guidelines 92 may suggest, for example, that: load balanced storage pools be provided; maximum workloads per storage pool (e.g., equal to 256) be set; no single point of failure exists in a fiber channel path; disjointed storage paths be provided for cluster nodes; maximum ratios of active-to-standby component mappings be provided for each subsystem port (e.g., 7:3), etc.

Managed/storage environment characteristics 96. Such characteristics 96 may include and/or identify, for example, computing components/resources in the storage environment cluster (e.g., a set of cluster nodes, a set of host bus adapters (HBAs), a set of fiber channel (FC) fabrics, a set of FC switches a set of storage controllers, a set of ports, a set of storage subsystems, a set of storage volumes, etc.), applications, configuration information, performance models, current loads and/or available capacities, events scheduled or in progress, etc.

These inputs are processed by engine 70 and utilized to produce an output plan 82 that (among other things) provides a data path through the various computing resources/components of the storage environment. In performing this functionality, administrator 94 may specify multiple workload requirements and select policies that need to be applied in the planning process. As such, the framework described herein provides for the following illustrative scenarios (among others):

Given the managed environment 96, identify the hosts that can potentially be included into a given cluster based on cluster type, host operating system, application type, etc.

Given a cluster, identify the hosts that can potentially be included in a cluster resource group based on application type, failure probability, server performance, etc.

Given a set of cluster nodes and workload requirements, identify the best allocation of storage and network resources that achieves required performance and resiliency.

Along these lines, engine 70 helps administrator 94 plan and provision storage resources for a storage cluster/environment. Engine 70 also recommends the fiber channel (FC) fabric zoning and multipath configurations. Among other things, cluster-aware storage resource provisioning should address the following factors:

A. Resiliency
1. Server (and cluster resource group) failure probability;
2. Server port reliability;
3. Switch connectivity (host-end, subsystem-end, etc.);
4. Fabric connectivity; and
5. Storage subsystem connectivity.

B. Performance
1. Fabric configuration and performance load balancing;
   a. Zoning, port performance;
2. Storage logical unit number (LUN) mapping configuration;
   a. Load on storage subsystem ports; and
   b. Load on subsystems' host adapters.

In general, "resiliency" ensures that a service is available even when one or more components fail. From a SAN perspective, resiliency has multiple main components: storage resiliency and data path resiliency. Storage resiliency is achieved using a redundant array of independent disks (RAID) arrays and other redundant device components. Data path resiliency ensures that the path from the storage LUN to the cluster node is resilient. This is typically achieved by making sure that there is no single point of failure in the active and stand-by data path. During failure, application would fail over to the standby server from the active server. Complete end-to-end resiliency must ensure that no single element on the data path becomes a single point of failure. These elements include FC fabric, switch connecting to server, FC switch connecting to storage controller, storage controller FC port, host FC port, LUN assignment, placement of the workload in one storage subsystem but under different device adapter, etc.

Similarly, a given "performance" factor may be dependent on performance of underlying disk subsystems and the data path performance. The performance characteristics of disk subsystems are dependent on the type of disks (SAS, SATA, SSD, etc.), RAID configuration, etc. In addition, the configuration of the data path may also impact performance. The framework shown in FIG. 5 provides (among other things) a balanced load along the FC data-path in a clustered environment. The workload has to be optimally balanced along the data path to avoid performance degradation or the occurrence of hotspots during failover.

Based on the workload and resource availability of data centers, different policies are employed to satisfy the administrator requirements. Cluster nodes are selected on the basis of the operating system and hardware configurations of the servers discovered by TPC and also on cluster type, application type, and workload requirements. Similarly, new hosts are added to the cluster resource group based on application requirements and failure characteristics.

This framework may utilize application-specific primitives available in the clustering software solutions to make it more tuned for the given applications. Also, given a planning knowledge base and policies, this framework may also perform a configuration analysis to recommended upgrade/downgrade of element capabilities (e.g., if administrator selects two hosts to make a cluster, this framework may suggest the requirement of downgrade of the operating system version for the feasibility of a particular cluster type).

ILLUSTRATIVE EXAMPLES

This section will set forth various illustrative examples to further describe the invention. It is understood that these examples (e.g., such as the provisioning policies described in FIGS. 6-10) are intended to be illustrative only and that other variations may be implemented hereunder.

Many enterprise and scientific applications rely on clustering solutions for their high performance and high availability needs. These applications may range from commercial databases to application servers to large parallel applications like scientific simulations and weather forecasting. Storage environments such as "clusters" provide a low-cost alternative to single computers of similar capabilities. Based on their type and configurations, clusters can be broadly grouped in multiple categories:

High availability (HA) clusters: The clustering software aims to reduce the service downtime by switching to one of the standby nodes, when a hardware or software component fails.

Load-balancing clusters: Multiple instances of the servers are run to provide the same set of services, and the load is distributed across all of them.

Compute clusters: These are typically used by large parallel applications as opposed to transactional applications. Application or data processing is typically sub-divided into multiple smaller components or data-sets and the tasks are distributed across multiple compute nodes for processing. The processed result may be later combined for further processing.

Different applications may have different requirements, and these clusters need to be appropriately provisioned and configured to deliver the required level of performance and availability. Historically, multiple challenges arise in provisioning resources for clusters. For example, the overall behavior of the cluster is dependent on the end-to-end configurations of multiple components including that of applications, servers, network, and storage. Moreover, even though the clustering software has the ability to detect failures in software and hardware components and take appropriate action (e.g., moving workload to stand-by nodes and rebalancing load), there are, however, no management tools that perform complete end-to-end configuration of the cluster resources. These are typically done by highly-skilled administrators using rule-of-thumb or back-of-the envelope calculations. As indicated above, manual methods tend to be prone to error, time consuming and tedious. These may also be over-provisioned, which increases the cost. Still yet, many cluster applications require access to shared storage, which give them a consistent view of their data from all nodes.

One storage technology that is being used for cluster environment is Network Attached Storage (NAS), which provides file-based access, and Storage Area Network (SAN), which provides block-based access to storage. Modern NAS and SAN are complex distributed systems and have a large number of possible configurations, which determine the overall application performance, availability, and other characteristics. Most of the current approaches do not take the entire end-to-end aspect (application, cluster, and SAN) into account because the overall storage system design may not be very resilient. For example, in a HA cluster, if both the active and standby nodes are using the same network path to access shared storage, the failure of any link or switch in that path would make both the nodes unavailable, thus bringing the entire service down. Furthermore, if the same network path is used by multiple cluster nodes to access shared storage, it can quickly become a performance bottleneck.

As indicated above, the approach of the present invention provides an integrated framework that automates the provisioning of shared network storage for clusters. This approach focuses on provisioning FC and SAN storage for high availability (HA) clusters, primarily because SAN is the most used storage technology in high-end enterprise environments and also one of the most complex. Among other things, the framework allocates storage and automatically configures the network path to make SAN storage accessible to the cluster nodes in a way that balances the overall load and avoid any single point of failure.

Once the clusters and cluster resource groups are set up, the framework configures the data path from the storage LUN to the cluster nodes. This is done by applying a series of policies that ensures that there is no single point of failure in the data path. FIGS. 6-10 depict various illustrative provisioning policies. In addition, for policies such as these, the following best practices may be implemented (wherever possible) to obtain required resiliency (it is understood that these best practices are intended to be illustrative only and that other alternatives may exist):

FC ports of active and standby cluster nodes are configured according to their fail-over characteristics.

Active and standby hosts should be connected to different host-end edge switches of the same fabric to protect from FC switch failure.

Active and standby hosts should access storage through different subsystem-end edge switches of the same fabric to protect from FC switch failure.

Active and standby hosts should be connected to different fabrics to protect from fabric failure.

Active and standby hosts should be assigned to different ports of the storage subsystem.

One objective of the above best practices is creating a disjointed data path for active and standby nodes. When an active node goes down because of the failed component in its data path, the standby node would be able to communicate with the LUN from a different data path. This ensures a higher degree of resiliency.

Figure 6:
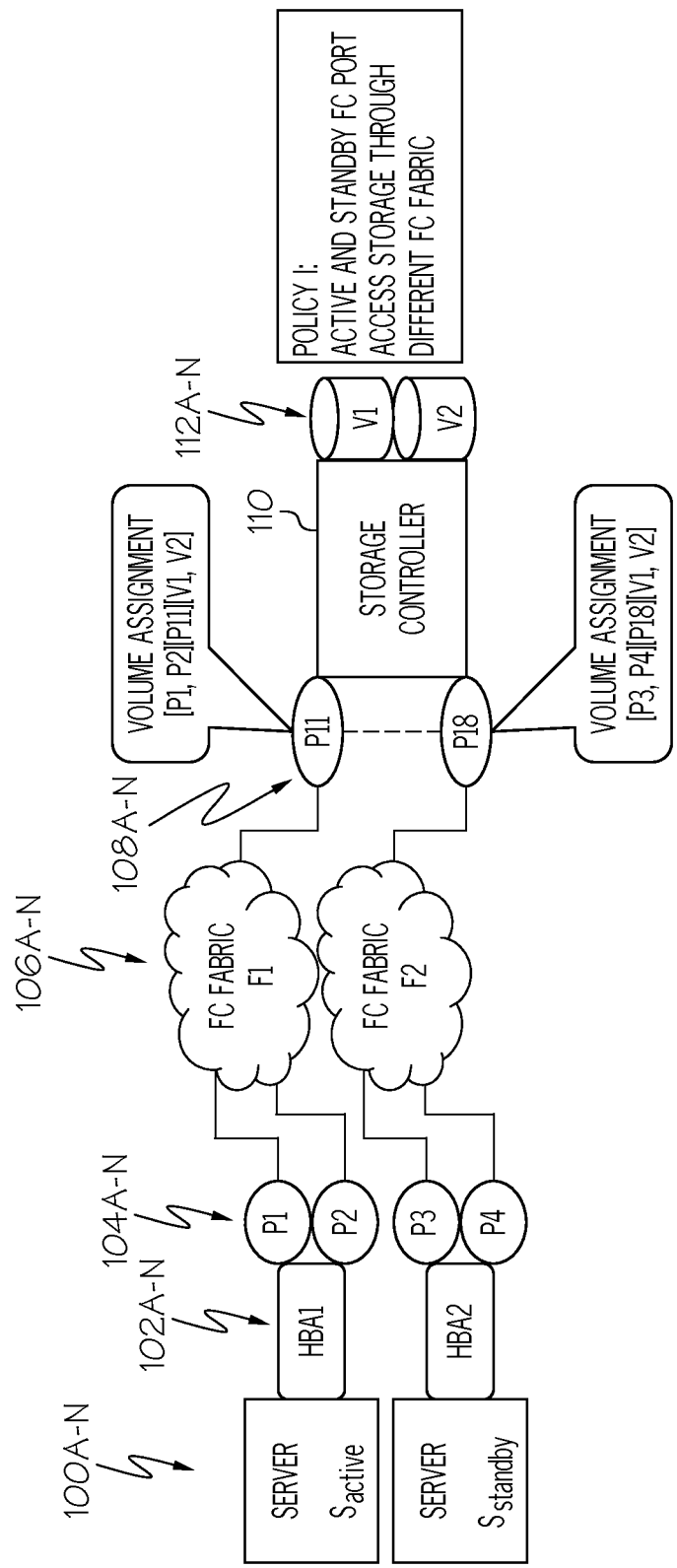
FIG. 6 depicts a policy implementation according to an embodiment of the present invention.

Referring now to FIG. 6, a provisioning policy is depicted. Specifically, FIG. 6 shows various computing components/resources that may be part of a storage environment/cluster (e.g., storage environment 76). As shown, such resources/components may include: servers/nodes 100A-N ($S_{active}$ and $S_{standby}$), host bus adapters 102A-N (HBA1 and HBA2), fabric/FC ports 104A-N (P1-P4), FC fabrics 106A-N (F1 and F2), controller ports 108A-B (P11 and P18), storage controller 110, and storage volumes 112A-N (V1-V2). Under this policy, active and standby FC ports 104A-N access storage via different FC Fabrics 106A-N. For example, ports P1-P2 communicate through FC Fabric F1, while ports P3-P4 communicate through FC Fabric F2.

Figure 7:
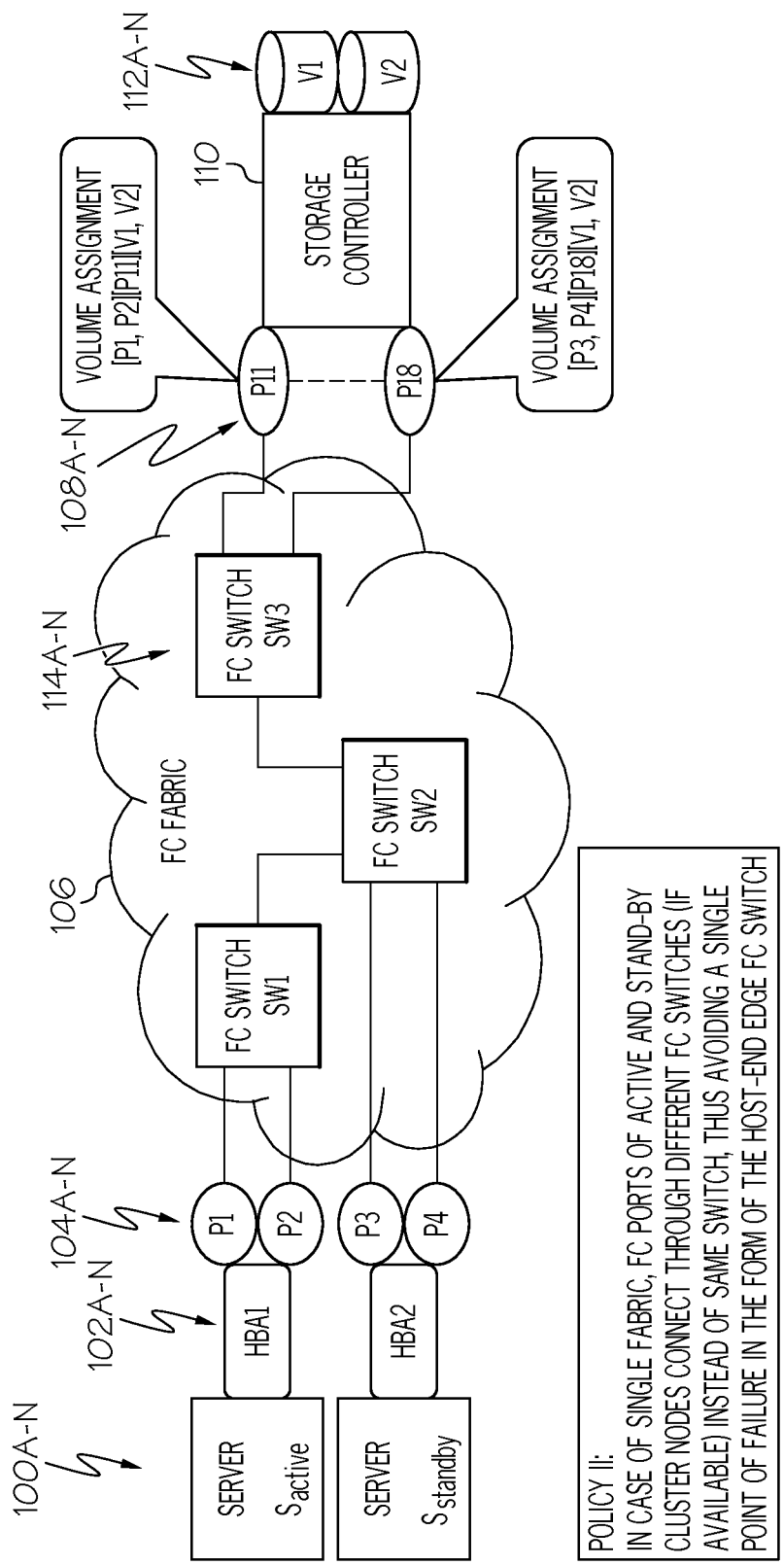
FIG. 7 depicts another policy implementation according to an embodiment of the present invention.

Referring now to FIG. 7, another provisioning policy is depicted. Specifically, FIG. 7 shows various computing components/resources that may be part of a storage environment/cluster (e.g., storage environment 76). As shown, such resources/components may include: servers/nodes 100A-N ($S_{active}$ and $S_{standby}$), host bus adapters 102A-N (HBA1 and HBA2), fabric/FC ports 104A-N (P1-P4), FC fabric 106, FC switches 114A-N (SW1-SW3), controller ports 108A-N (P11 and P18), storage controller 110, and storage volumes 112A-N (V1-V2). Under this policy, the data path routes data though a plurality of switches SW1-SW3 in a single FC fabric 106. Along these lines, FC ports 104A-N initially communicate with different switches. For example, active FC ports P1-P2 communicate with FC switch SW1, while standby FC ports P3-P4 communicate with FC switch SW2.

Figure 8:
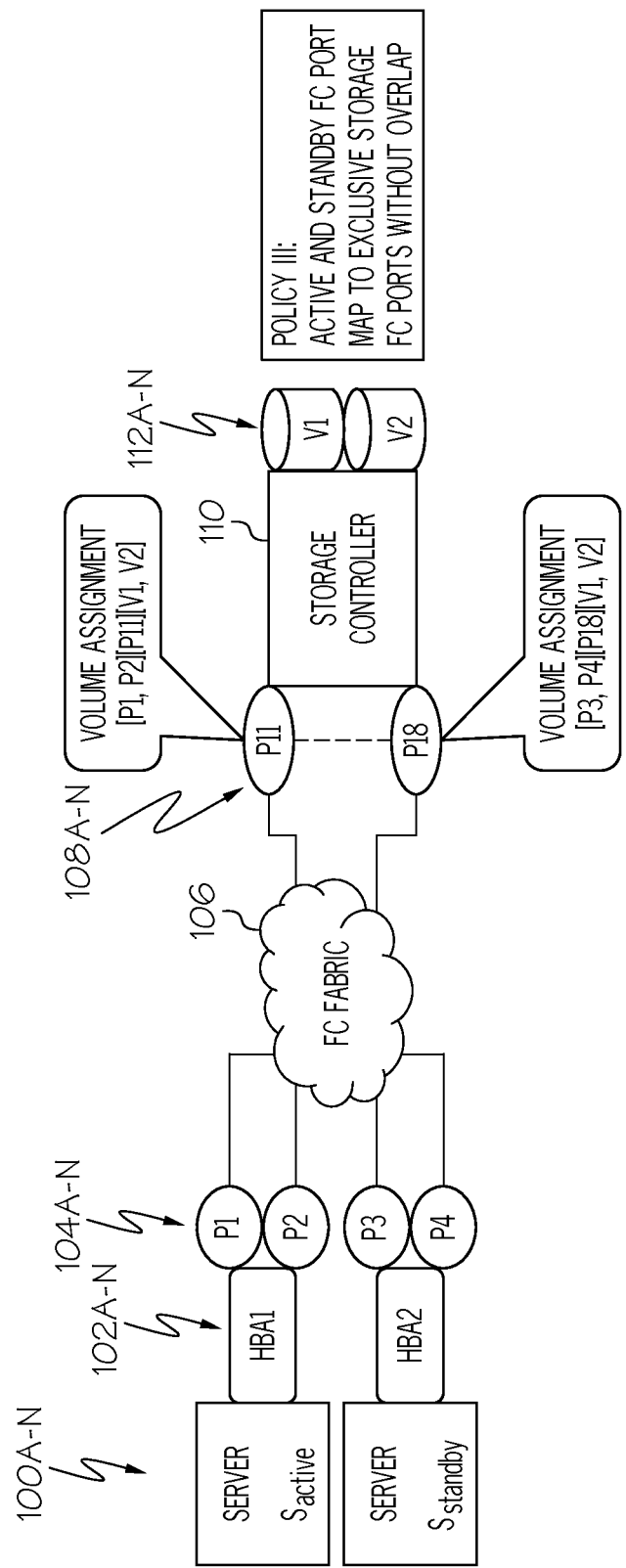
FIG. 8 depicts another policy implementation according to an embodiment of the present invention.

Referring now to FIG. 8, another provisioning policy is depicted. Specifically, FIG. 8 shows various computing components/resources that may be part of a storage environment/cluster (e.g., storage environment 76). As shown, such resources/components may include: servers/nodes 100A-N ($S_{active}$ and $S_{standby}$), host bus adapters 102A-N (HBA1 and HBA2), fabric/FC ports 104A-N (P1-P4), FC fabric 106, controller ports 108A-N (P11 and P18), storage controller 110, and storage volumes 112A-N (V1-V2). Under this policy, active and standby ports are mapped to exclusive controller ports without overlap. For example, FC ports P1-P2 are mapped to controller port P11, while FC ports P3-P4 are mapped to controller port P18.

Figure 9:
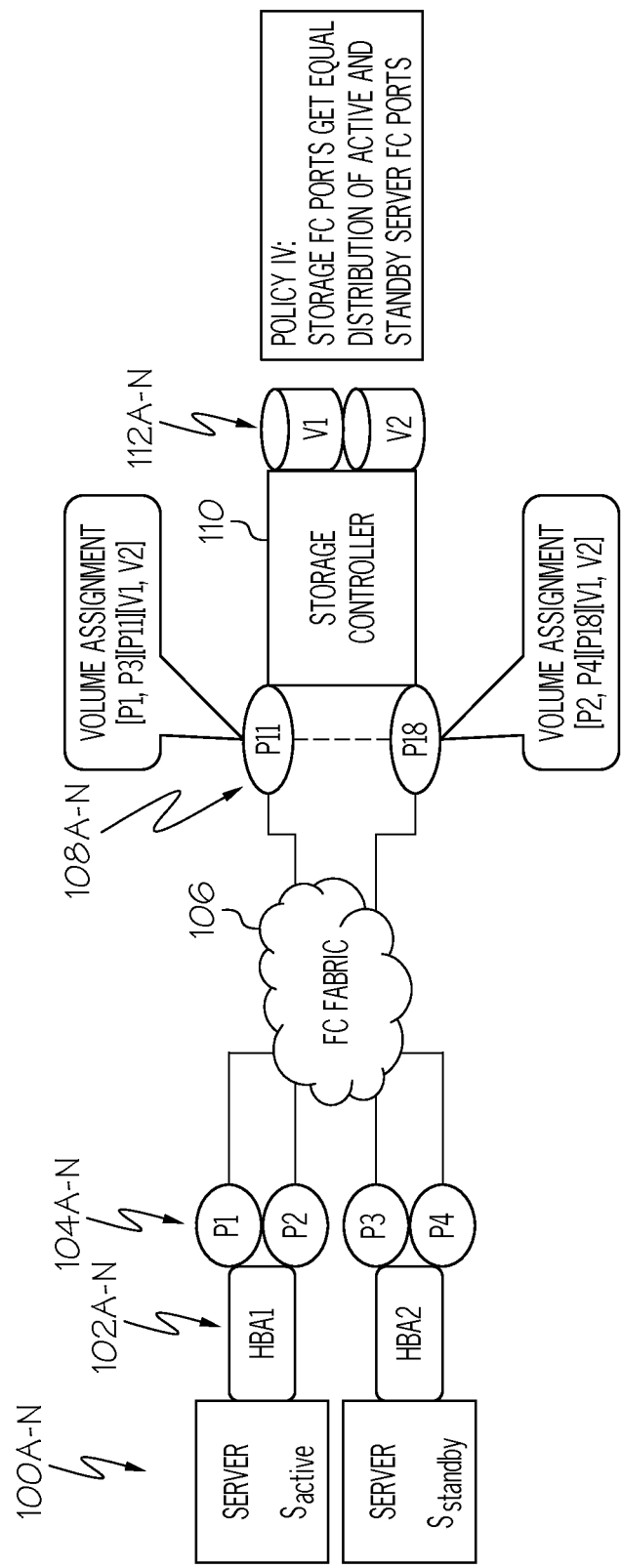
FIG. 9 depicts another policy implementation according to an embodiment of the present invention.

Referring now to FIG. 9, another provisioning policy is depicted. Specifically, FIG. 9 shows various computing components/resources that may be part of a storage environment/cluster (e.g., storage environment 76). As shown, such resources/components may include: servers/nodes 100A-N ($S_{active}$ and $S_{standby}$), host bus adapters 102A-N (HBA1 and HBA2), fabric/FC ports 104A-N (P1-P4), FC fabric 106, controller ports 108A-N (P11 and P18), storage controller 110, and storage volumes 112A-N (V1-V2). Under this policy, controller ports 108A-N are mapped to an equal distribution of active versus standby FC ports 104A-N. For example, controller port P11 is mapped to active FC port P1 and standby FC port P3, while controller port P18 is mapped to active FC port P2 and standby FC port P4.

Figure 10:
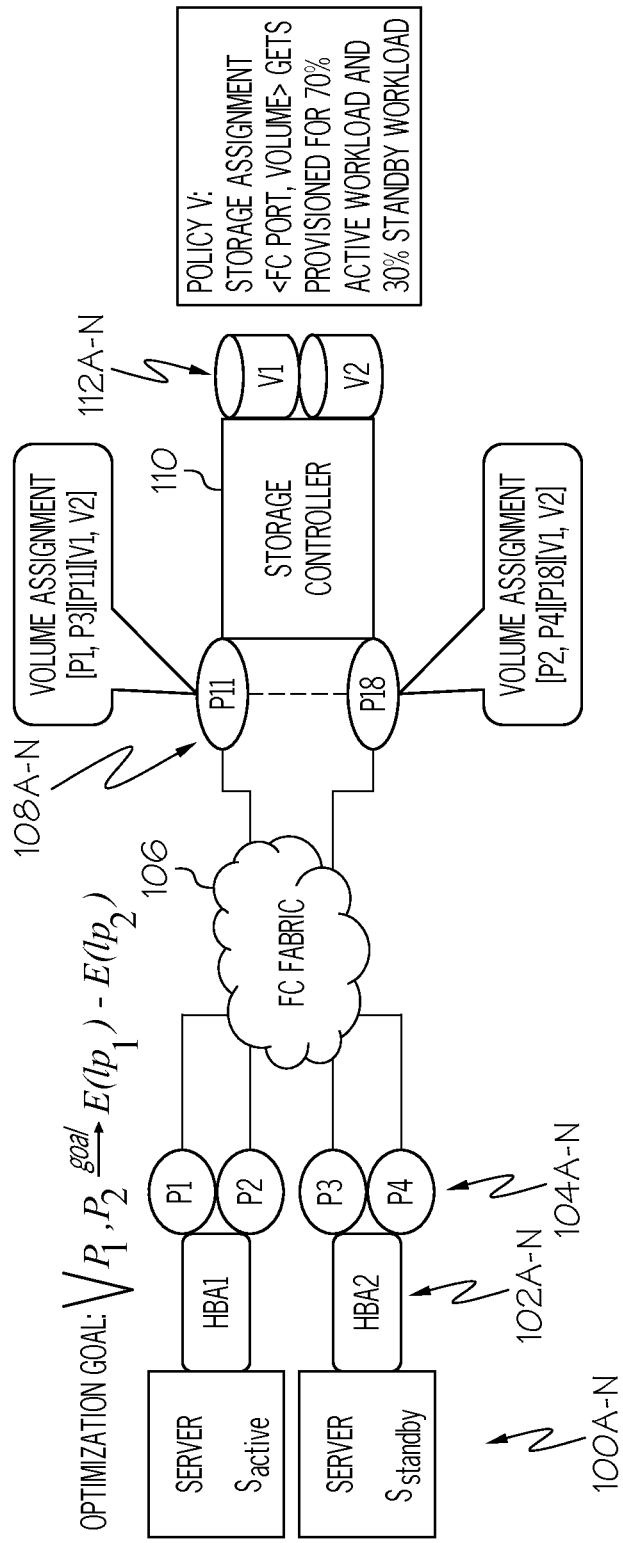
FIG. 10 depicts another policy implementation according to an embodiment of the present invention.

Referring now to FIG. 10, another provisioning policy is depicted. Specifically, FIG. 10 shows various computing components/resources that may be part of a storage environment/cluster (e.g., storage environment 76). As shown, such resources/components may include: servers/nodes 100A-N ($S_{active}$ and $S_{standby}$), host bus adapters 102A-N (HBA1 and HBA2), fabric/FC ports 104A-N (P1-P4), FC fabric 106, controller ports 108A-N (P11 and P18), storage controller 110, and storage volumes 112A-N (V1-V2). Under this policy, storage space is assigned based upon a workload distribution that comprises a combination of active workloads and standby workloads. In the example shown, the following algorithm may be applied:

$$E(L_p) = \sum_i^{M_p} \frac{w_i}{\eta_i^{active}} + \sum_i^{N_p} f_i + \frac{w_i}{\eta_i^{standby}}$$

Where:
Mp=Set of LUN workloads mapped to active cluster nodes via port p;
Np=Set of LUN workloads mapped to standby cluster nodes via port p;
Wi=Load due to workload i;
Fi=Failure rate of path related to port i;
Ni=Number of FC ports sharing workload Wi for active or standby nodes;
Lp=Load on port p; and
E(Ip)=Expected load on port p.

In implementing the above algorithm, engine 70 may set an optimization goal such as the following:

$$Vp1, p1 \rightarrow E(Lp1) \sim E(Lp2)$$

This allows a particular ratio of active workloads to standby workloads (e.g., 70:30) to be implemented and the corresponding data path to be determined.

Figure 11:
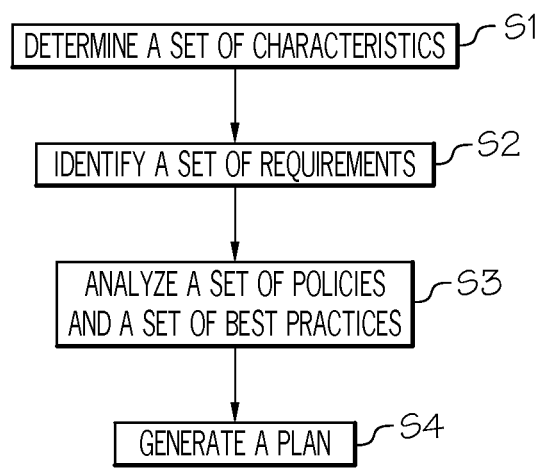
FIG. 11 depicts a method flow diagram according to an embodiment of the present invention.

Referring now to FIG. 11, a method flow diagram according to the present invention is show. In step S1, a set of characteristics of a storage environment comprising a set of computing resources/components (e.g., a set of cluster nodes, a set of host bus adapters (HBAs), a set of fiber channel (FC) fabrics, a set of storage controllers, a set of ports, and/or a set of storage volumes, etc.) is determined. In step S2, a set of requirements is identified for a set of workloads to be processed by the set of computing resources. In step S3, a set of policies and a set of best practices is analyzed to identify a configuration of the storage environment to optimize the processing of the set of workloads according to the set of requirements. In step S4, a plan is generated based on the configuration, the plan indicating a data path through the set of computing resources that minimizes a potential for error in processing the set of workloads.

While shown and described herein as an analytical resource provisioning solution, it is understood that the invention further provides various alternative embodiments. For example, in one embodiment, the invention provides a computer-readable/useable medium that includes computer program code to enable a computer infrastructure to provide analytical resource provisioning functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide analytical resource provisioning functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for analytical resource provisioning. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for providing cluster-aware resource provisioning in a cloud computing environment, comprising:
    determining a set of characteristics of a storage environment, the storage environment comprising a set of computing resources, the set of computing resources including a set of cluster nodes and a set of fiber channel (FC) fabrics in the cloud computing environment;
    identifying, by at least one computer device, a set of requirements from a database for a set of workloads to be processed by the set of computing resources, the set of requirements including that the set of workloads corresponding to a particular application must be performed on the set of cluster nodes in the set of computing resources;
    analyzing, by the at least one computer device, a set of policies and a set of best practices from a database to identify a configuration of the storage environment to optimize the processing of the set of workloads on the set of cluster nodes according to the set of requirements, the set of policies and the set of best practices including a storage resiliency requirement, a data path resiliency requirement, a fabric load balancing requirement and a storage load balancing requirement;
    generating, by the at least one computer device, a plan based on the configuration, the plan indicating a data path through switches and paths in the set of computing resources to the set of cluster nodes that implements the set of policies and the set of best practices in processing the set of workloads; and
    forwarding the plan to an administrator over a computer network.

2. The computer-implemented method of claim 1, the set of policies comprising a policy whereby the data path routes data through a plurality of FC fabrics to a set of storage volumes of the storage environment.

3. The computer-implemented method of claim 1, the set of policies comprising a policy whereby the data path routes data though a plurality of switches in a single FC fabric of the storage environment.

4. The computer-implemented method of claim 1, the set of policies comprising a policy whereby a set of active FC ports are mapped to particular controller ports of the storage environment and a set of standby FC ports are mapped to different controller ports of the storage environment from the particular controller ports.

5. The computer-implemented method of claim 1, the set of policies comprising a policy whereby a set of active FC ports and a set of standby FC ports are equally distributed in a mapping to a set of controller ports.

6. The computer-implemented method of claim 1, the set of policies comprising a policy whereby storage space is assigned based upon a workload distribution.

7. The computer-implemented method of claim 6, the workload distribution comprising a combination of active workloads and standby workloads, wherein a standby workload must be allocated to storage space that is separate from an associated active workload.

8. The computer-implemented method of claim 1, the set of computing resources further comprising at least one of the following: a set of host bus adapters (HBAs), a set of storage controllers, a set of ports, or a set of storage volumes.

9. A system for providing cluster-aware resource provisioning in a cloud computing environment, comprising:
    a bus;
    a processor coupled to the bus; and
    a memory medium coupled to the bus, the memory medium comprising instructions to:
        determine a set of characteristics of a storage environment, the storage environment comprising a set of computing resources, the set of computing resources including a set of cluster nodes and a set of fiber channel (FC) fabrics in the cloud computing environment;
        identify, by at least one computer device, a set of requirements from a database for a set of workloads to be processed by the set of computing resources, the set of requirements including that the set of workloads corresponding to a particular application must be performed on the set of cluster nodes in the set of computing resources;
        analyze, by the at least one computer device, a set of policies and a set of best practices from a database to identify a configuration of the storage environment to optimize the processing of the set of workloads on the set of cluster nodes according to the set of requirements, the set of policies and the set of best practices including a storage resiliency requirement, a data path resiliency requirement, a fabric load balancing requirement and a storage load balancing requirement;

generate, by the at least one computer device, a plan based on the configuration, the plan indicating a data path through switches and paths in the set of computing resources to the set of cluster nodes that implements the set of policies and the set of best practices in processing the set of workloads; and forward the plan to an administrator over a computer network.

10. The system of claim 9, the set of policies comprising a policy whereby the data path routes data through a plurality of FC fabrics to a set of storage volumes of the storage environment.

11. The system of claim 9, the set of policies comprising a policy whereby the data path routes data though a plurality of switches in a single FC fabric of the storage environment.

12. The system of claim 9, the set of policies comprising a policy whereby a set of active FC ports are mapped to particular controller ports of the storage environment and a set of standby FC ports are mapped to different controller ports of the storage environment from the particular controller ports.

13. The system of claim 9, the set of policies comprising a policy whereby a set of active FC ports and a set of standby FC ports are equally distributed in a mapping to a set of controller ports.

14. The system of claim 9, the set of policies comprising a policy whereby storage space is assigned based upon a workload distribution.

15. The system of claim 14, the workload distribution comprising a combination of active workloads and standby workloads, wherein a standby workload must be allocated to storage space that is separate from an associated active workload.

16. The system of claim 9, the set of computing resources comprising at least one of the following components: a set of host bus adapters (HBAs), a set of storage controllers, a set of ports, or a set of storage volumes.

17. A computer program product for providing cluster-aware resource provisioning in a cloud computing environment, the computer program product comprising a computer readable storage device, and program instructions stored on the computer readable storage media, to:

determine a set of characteristics of a storage environment, the storage environment comprising a set of computing resources, the set of computing resources including a set of cluster nodes and a set of fiber channel (FC) fabrics in the cloud computing environment;

identify, by at least one computer device, a set of requirements from a database for a set of workloads to be processed by the set of computing resources, the set of requirements including that the set of workloads corresponding to a particular application must be performed on the set of cluster nodes in the set of computing resources;

analyze, by the at least one computer device, a set of policies and a set of best practices from a database to identify a configuration of the storage environment to optimize the processing of the set of workloads on the set of cluster nodes according to the set of requirements, the set of policies and the set of best practices including a storage resiliency requirement, a data path resiliency requirement, a fabric load balancing requirement and a storage load balancing requirement;

generate, by the at least one computer device, a plan based on the configuration, the plan indicating a data path through switches and paths in the set of computing resources to the set of cluster nodes that implements the set of policies and the set of best practices in processing the set of workloads; and forward the plan to an administrator over a computer network.

18. The computer program product of claim 17, the set of policies comprising a policy whereby the data path routes data through a plurality of FC fabrics to a set of storage volumes of the storage environment.

19. The computer program product of claim 17, the set of policies comprising a policy whereby the data path routes data though a plurality of switches in a single FC fabric of the storage environment.

20. The computer program product of claim 17, the set of policies comprising a policy whereby a set of active FC ports are mapped to particular controller ports of the storage environment and a set of standby FC ports are mapped to different controller ports of the storage environment from the particular controller ports.

21. The computer program product of claim 17, the set of policies comprising a policy whereby a set of active FC ports and a set of standby FC ports are equally distributed in a mapping to a set of controller ports.

22. The computer program product of claim 17, the set of policies comprising a policy whereby storage space is assigned based upon a workload distribution.

23. The computer program product of claim 22, the workload distribution comprising a combination of active workloads and standby workloads, wherein a standby workload must be allocated to storage space that is separate from an associated active workload.

24. The computer program product of claim 17, the set of computing resources comprising at least one of the following components: a set of host bus adapters (HBAs), a set of storage controllers, a set of ports, or a set of storage volumes.

25. A method for deploying a system for providing cluster-aware resource provisioning in a cloud computing environment, comprising:

providing a computer infrastructure being operable to:

determine a set of characteristics of a storage environment, the storage environment comprising a set of computing resources, the set of computing resources including a set of cluster nodes and a set of fiber channel (FC) fabrics in the cloud computing environment;

identify, by at least one computer device, a set of requirements from a database for a set workloads to be processed by the set of computing resources, the set of requirements including that the set of workloads corresponding to a particular application must be performed on the set of cluster nodes in the set of computing resources;

analyze, by the at least one computer device, a set of policies and a set of best practices from a database to identify a configuration of the storage environment to optimize the processing of the set of workloads on the set of cluster nodes according to the set of requirements, the set of policies and the set of best practices including a storage resiliency requirement, a data path resiliency requirement, a fabric load balancing requirement and a storage load balancing requirement;

generate, by the at least one computer device, a plan based on the configuration, the plan indicating a data path through switches and paths in the set of computing resources to the set of cluster nodes that implements the set of policies and the set of best practices in processing the set of workloads; and forward the plan to an administrator over a computer network.

* * * * *